Dec. 5, 1944. V. SPENCER 2,364,248
METHOD AND APPARATUS FOR MANUFACTURING HARD SURFACE COVERING
Filed Feb. 10, 1940

Inventor
Virgil Spencer
by
Walter J Kaufman
Attorney

Patented Dec. 5, 1944

2,364,248

UNITED STATES PATENT OFFICE 2,364,248

METHOD AND APPARATUS FOR MANUFACTURING HARD-SURFACE COVERING

Virgil Spencer, Manheim Township, Lancaster County, Pa., assignor to Armstrong Cork Company, Lancaster, Pa., a corporation of Pennsylvania Application February 10, 1940, Serial No. 318,213

13 Claims. (Cl. 18—2)

This invention relates to a method and apparatus for manufacturing hard surface covering and, more particularly, to a method and apparatus for manufacturing variegated hard surface covering including linoleum, asphalt floor covering, rubber floor covering, or the like, with a minimum of scrap and without substantial change in the direction of variegation.

A common practice in the linoleum industry is to produce variegated linoleum by what is usually termed the "cross-rolling" process. In such process, vari-colored granules of linoleum composition are calendered to produce a sheet having striations extending longitudinally of the sheet. Such type of graining is commonly called "jaspe." The jaspe sheet is severed in sections, the sections overlapped and fed thru a second calender in a direction normal to the direction of the striations, thus shortening and spreading the striations and producing what is generaly termed a "marble" type of graining.

When such process is followed, frequently in the formation of marble sheets, it is observed that the variegations at the opposite edges of the sheet veer or turn substantially at right angles to run longitudinally of the sheet, such longitudinal turning of the variegations extending inwardly as much as twelve inches from each edge of the sheet. If such portions were permitted to remain in the sheet, small "rivers" would be formed at the juncture of adjacent sheets in an installation of such covering, thus detracting from the appearance of the completed floor. Consequently, the usual practice in the industry is to discard such portions of the sheet as scrap. Needless to say, this procedure is expensive and undesirable, due to the large amount of scrap so created.

The chief object of this invention is to provide a method and apparatus for producing variegated sheets of hard surface covering which eliminates any objectionable appearance of the edges of the sheets so formed. An object of my invention is to provide a method and apparatus which considerably reduces the amount of scrap involved in the manufacture of hard surface coverings. A further object is to provide a method and apparatus which eliminates veering or change of direction of striations at the edges of variegated sheets and which satisfactorily trims such sheets to a desired width. A still further object is to provide an apparatus for making variegated hard surface covering in which selvage bands are provided at the edges of such covering. A still further object is to provide an apparatus adapted to form a sheet of variegated hard surface covering and to trim the formed sheet to a desired width as it leaves the apparatus.

This invention relates to the combination with a sheeting calender adapted to form a continuous sheet of plastic composition of means for removing the central portion of the formed sheet from the calender roll and means spaced from the first mentioned means for removing side portions of the formed sheet from the calender roll. The invention includes in combination with the sheeting calender selvage bands of plastic composition encircling opposite ends of a roll thereof.

This invention further relates to a method of making continuous sheets of plastic composition which includes the steps of calendering plastic composition to form a continuous sheet, removing the central portion of the formed sheet from the calender roll while permitting side portions of the sheet to encircle the roll, removing minor portions of the roll encircling portions of the sheet, and feeding plastic composition thereto to renew the encircling portions.

The attached drawing illustrates a preferred embodiment of my invention, in which, Figure 1 is a plan view of a sheeting calender having the top roll removed and serving to illustrate my invention;

Figure 1:
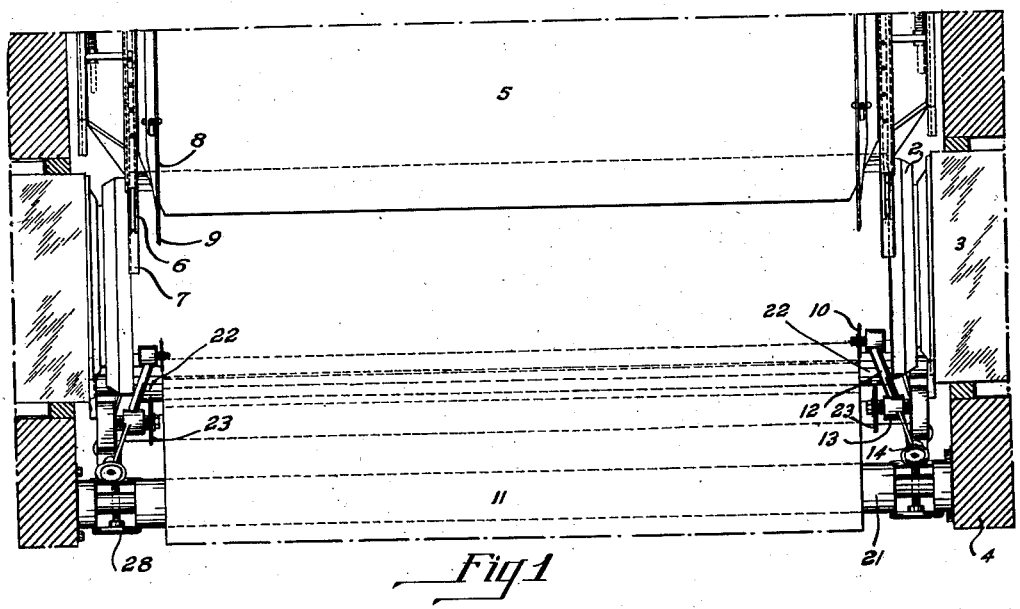
Figure 2:
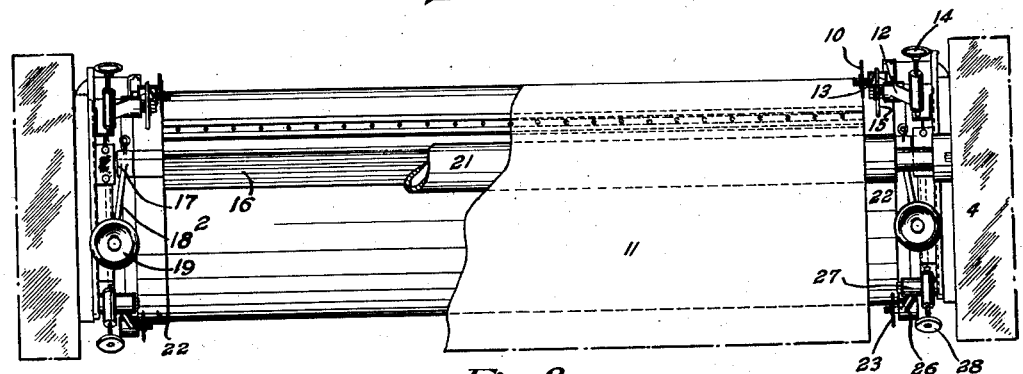
Figure 2 is a view in elevation of the device shown in Figure 1.
Figure 3:
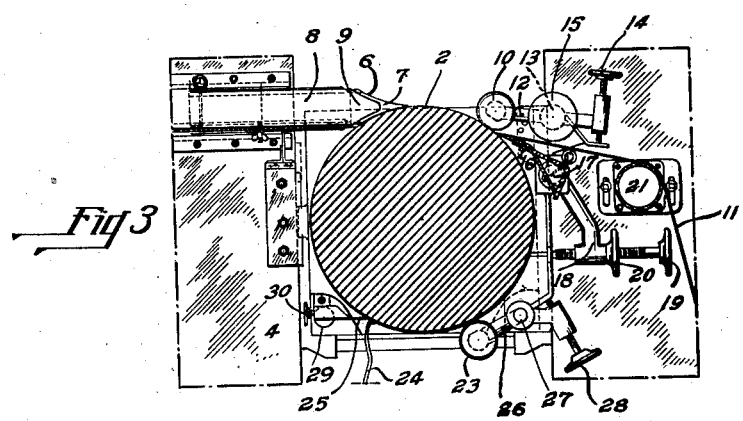
Figure 3 is a sectional view of the sheeting calender shown in Figure 1.

Referring to the drawing, there is illustrated a linoleum calender including a bottom roll 2 mounted in suitable journals 3 placed on the framework 4 forming the foundation of the calender. The top roll of the calender is not shown, being removed in order that my invention may be more satisfactorily illustrated. It is not believed a full description of the linoleum calender is required, since such calenders are well known in the industry. Any desired means may, of course, be used to actuate the rolls of the calender.

Placed at one side of the calender is a feed table 5 upon which sheets may be positioned for feeding to the bite of the calender rolls. Selvage plates 6 are positioned at longitudinal opposite sides of the calender rolls and carry selvage tips 7 which bear tightly against the calender rolls and serve to prevent further outward flow of the composition forming the fed sheets. A short distance inwardly of the plates 6 are positioned guide plates 8 carrying guide tips 9 which bear tightly against the hot roll of the calender, in this case, the top roll (not shown), and are placed a short distance away from the cold roll of the calender, in this case the bottom roll 2, to permit composition to flow outwardly until it is halted by the selvage plates 6. The tips 7 and 9, are, of course, removable from the plates 6 and 8 and are preferably of some material such as wood, less hard than the material forming the calender rolls in order to obviate excessive wear thereof. It will be appreciated the expense involved in replacing tips 7 and 9 as they wear away in all cases is minute in comparison to the expense involved in replacing the rolls of the calender. The plates 6 and 8 carrying the tips 7 and 9 are adjustable to vary the force with which the tips 7 and 9 bear against the calender rolls in order that the tips may be moved toward the rolls as they wear away in use.

Cutters or cutting wheels 10 are provided to trim to precise dimensions the sheet formed by the calender rolls. The cutters 10 bear against the cold roll 2 and are so mounted as to be freely rotatable so that they may be rotated by rotation of the roll 2 and to some slight extent by movement of the sheet 11 formed by the calender rolls. Each cutter 10 is mounted upon an arm or lever 12 secured to a shaft 13 and may be adjusted by means of the adjusting screw 14. In other words, the cutter 10 is so mounted upon an arm or lever 12 pivoted on the shaft 13 that by moving the adjusting screw 14 inwardly against the lever 12, the lever 12 serves to move the cutter 10 inwardly against the circumference of the roll 2. By means of an adjusting wheel 15, the cutters 10 may be moved on the shaft 13 to vary the width of the trimmed sheet. Due to its composition, the formed sheet 11 normally adheres to the cold roll 2 and accordingly a doctor blade 16 is provided to remove the sheet 11 therefrom. The doctor blade 16 is placed against the roll 2 and is adjustable to assure positive removal of the sheet 11. The doctor blade 16 is mounted on the shaft 17 and connected to the lever 18; by means of the adjusting screw 19 the blade 16 may be pivoted about the shaft 17 and placed in desired position against the roll 2 and locked in such position by the lock wheel 20. The trimmed sheet 11 is led over an idler roll 21 to an inlaying machine of the Walton or Batten type, or if desired, it may be secured to a backing, as is well known in the industry.

It will be appreciated so trimming the sheet permits selvage bands 22 to form at each end of the cold roll 2. Such bands 22 adhere to the cold roll 2 and are sufficiently wide to eliminate veering or change in direction of the graining at the edges of the formed sheet 11. I have found, however, that if such bands 22 be permitted to remain as originally formed, the pressure of the rolls as repeatedly applied thereto render the bands neutral in shade thus changing their appearance from that of the sheet being formed. This is undesirable since some of the composition forming such bands may accidentaly or inadvertently at some time during the formation of the sheet, flow inwardly to form a portion of the formed sheet 11. Needless to say, this would so detract from the appearance of the sheet as to necessitate large portions of the formed sheet being discarded as scrap. Accordingly, I provide trimming blades 23 which continually cut away small ribbons 24 of composition from the selvage bands. The cut ribbons 24 of the bands 22 likewise adhere to the cold roll 2 which necessitates some provision for their removal. I provide small doctor blades 25 which continually remove such small cut away ribbons from the selvage bands. By continually removing a small portion of the selvage bands 22, fresh composition continually flows outwardly to renew such bands, thus ensuring that such bands remains substantially the same in color as the sheet being formed. The trimming blades 23 are mounted on arms 26 pivoted about a shaft 27 and are adjustable by means of the adjusting screw 28 so as to bear against the roll 2 to positively sever ribbons 24 of composition from the bands 22. The blades 23 may if desired be moved longitudinally along the roll 2 to vary the width of the ribbons 24 severed from the bands 22. Likewise, the doctor blades 25 may be pivoted about a shaft 29 and moved inwardly against the roll 2 by means of the adjusting screw 30.

The operation of the device may be carried out in the following manner. Small sectional sheets of linoleum composition having a jaspe graining are overlapped and positioned on the feed table 5 with the striations of the sheets extending in a direction normal to the direction of feeding. Such sheets may be previously prepared by feeding vari-colored granules of linoleum composition to a two-roll calender to produce a sheet having striations extending longitudinally thereof, such sheet is then severed in small sheets which are overlapped as above described. The overlapped sheets are fed to the rolls of the calender and formed in a unitary sheet. It will be appreciated the striations or graining of the sheets are shortened and spread by such calendering operation to produce what is generally termed a "marble" sheet. The pressure of the calender rolls is sufficient to cause the composition to flow outwardly until it is stopped by the salvage plates 6; the guide plates 8 being securely against the top roll while being spaced a slight distance from the cold bottom roll 2, the composition is free to flow thereunder. Due to the nature of the composition, it tends normally to adhere to the colder roll of the calender.

Reiterating, the pressure of the rolls forms a unitary sheet; such sheet is severed to a predetermined width by means of the cutters 10 and removed from the cold roll 2 by the doctor blade 16. The small portions of the formed sheet between the guide plates 8 and the selvage plates 6 are not removed by the doctor 16 and are free to form selvage bands 22 on each end of the roll 2. Such selvage bands 22 adhere to the roll 2 and in the continuous formation of the unitary sheet prevent the variegations from veering or turning substantially at right angles to run longitudinally of the sheet. To prevent the bands 22 being rendered neutral in shade by repeatedly being subjected to the pressure of the calender rolls, small ribbons 24 of composition are continually severed from the bands 22 by the trimming blades 23 and are removed from the roll 2 by the doctors 25. Thus, minor amounts of fresh composition are continually being fed into and formed as a part of the bands 22 which obviate any substantial change in shade thereof.

It will be appreciated heretofore in the manufacture of hard surface floor or wall coverings having a so-called "marble" decoration, large quantities of scrap were created by the tendency of the variegations to veer or turn and flow at right angles to their original direction which required portions of the sheet to be discarded as unsatisfactory for use. By my invention, such portions of the sheet are not formed, thus assuring a tremendous saving in material costs. The selvage bands prevent such change of direction, or if such defect occurs, it occurs in the selvage bands where it is immaterial and does not cause scrap. My invention is likewise satisfactorily employed in the manufacture of plain or mono-colored hard surface covering and assists materially in the elimination of scrap since it obviates the necessity for forming large selvage portions in such coverings.

The composition forming the selvage bands is reused many times in the formation of the unitary sheet thus preventing large amounts of composition being wasted in the production of end portions of the sheet, since the presence of such bands prevents the formation of portions of the sheet not designed for use. Such bands are continually renewed but only minute quantities of composition are required for such renewal.

My invention is particularly adapted for use in the so-called "cross-rolling" process of forming variegated hard surface coverings and is likewise of service in connection with the formation of other types of grained or variegated coverings. While I have described the formation of a variegated covering by feeding overlapped striated sheets to a calender, the striations extending in a direction normal to the direction of the sheet to be produced, it will be understood my invention is likewise advantageous in the formation of striated sheets from granulated composition, for example, or may be employed in the manufacture of mono-colored hard surface coverings.

While I have described and illustrated a preferred embodiment of my invention, it will be understood my invention is not limited thereto, since it may be otherwise embodied within the scope of the following claims.

I claim:

1. In combination with a sheeting calender adapted to form a continuous sheet of plastic composition, means for severing the central portion from the formed sheet thereby permitting bands of plastic composition to encircle opposite ends of a calender roll, a doctor blade to remove the central portion of the formed sheet from the calender roll, and means spaced from said doctor blade for removing ribbons of plastic composition from the bands thus permitting fresh plastic composition to renew the bands.

2. In combination with a sheeting calender including hot and cold rolls adapted to form a continuous variegated sheet of plastic composition, adjustable cutters for severing the central portion from the formed sheet thereby permitting bands of plastic composition to encircle opposite ends of the cold roll, said bands serving to prevent veering of the graining during the formation of the variegated sheet, a doctor blade to remove the central portion of the formed sheet from the cold roll, trimming blades for severing ribbons of plastic composition from the bands, and doctor blades spaced from said first mentioned doctor blade for removing the ribbons from the bands thus permitting fresh plastic composition to renew the bands.

3. In combination with a sheeting calender including hot and cold rolls adapted to form a variegated sheet, selvage plates placed against said rolls serving to prevent outward flow of composition during the sheeting operation thus defining the width of the sheet to be formed, guide plates positioned inwardly of said selvage plates, said guide plates fitting securely against the hot roll and being placed a slight distance from the cold roll to permit composition to flow outwardly along the cold roll until outward flow thereof is halted by said selvage plates, means for severing a formed sheet having a required width less than the distance between selvage plates thus permitting selvage bands to form encircling each end of the cold roll, means for removing the formed sheet from the cold roll, trimming blades for severing ribbons from said selvage bands, and a plurality of doctor blades for removing the severed ribbons from the cold roll, said guide plates permitting fresh composition to flow outwardly to renew the selvage bands as the ribbons are removed therefrom.

4. In combination with a sheeting calender including hot and cold rolls adapted to form a variegated sheet, selvage plates placed against said rolls serving to prevent outward flow of composition during the sheeting operation thus defining the width of the sheet to be formed, guide plates positioned inwardly of said selvage plates, said guide plates fitting securely against the hot roll and being placed a slight distance from the cold roll to permit composition to flow outwardly along the cold roll until outward flow thereof is halted by said selvage plates, cutters for severing a formed sheet having a required width less than the distance between selvage plates thus permitting selvage bands to form encircling each end of the cold roll, a doctor blade for removing the formed sheet from the cold roll, trimming blades for severing ribbons from said selvage bands, and a plurality of doctor blades for removing the severed ribbons from the cold roll, said guide plates permitting fresh composition to flow outwardly to renew the selvage bands as the ribbons are removed therefrom.

5. In the method of making continuous sheets of plastic composition, the steps which comprise calendering plastic composition to form a continuous sheet, removing the central portion of the formed sheet from the calender roll while permitting side portions of the sheet to encircle the roll, removing minor portions of the roll encircling portions of the sheet, and feeding composition thereto to renew the encircling portions.

6. In the method of making continuous sheets of plastic composition, the steps which comprise calendering plastic composition to form a continuous sheet, severing side portions from said sheet, forming the severed side portions into bands encircling the ends of a calender roll, continuously removing ribbons from said bands, and continuously feeding plastic composition to renew the bands 7. In the method of making continuous sheets of plastic composition, the steps which comprise calendering plastic composition to form a continuous sheet, removing the central portion of the formed sheet from the calender roll while permitting non-contiguous portions of the formed sheet to encircle the calender roll, removing minor portions of the roll encircling portions of the sheet, and continuously feeding plastic composition to renew the removed portions.

8. In the method of making continuous sheets of plastic composition the steps which comprise calendering plastic composition to form a continuous sheet, forming lateral portions of the formed sheet into bands encircling a calender roll while removing the central portion of the sheet from the calender roll, removing minor portions of the bands, and continuously feeding plastic composition to renew the removed portions.

9. In the method of making linoleum sheets, the steps which comprise calendering linoleum composition to form a continuous sheet, severing selvage portions from said sheet, forming the severed selvage portions into bands encircling the ends of a calender roll, removing ribbons from said bands, forcing fresh composition outwardly along the roll to renew the bands, and removing the formed continuous sheet from the calender.

10. In the method of making variegated sheets, the steps which comprise calendering overlapped grained sheets at an angle to the direction of graining thereby shortening and spreading the graining and forming a continuous variegated sheet, severing selvage portions from said sheet and permitting the severed portions to form bands encircling the roll, removing small ribbons from said bands, and forcing fresh composition outwardly along such roll to renew the bands.

11. In the method of making variegated linoleum sheets, the steps which comprise forming linoleum composition into a grained sheet in which the graining extends longitudinally thereof, severing such sheets into sections, overlapping said sections, calendering the overlapped grained sections at an angle to the direction of graining thereby shortening and spreading the graining and forming a continuous variegated sheet, severing selvage portions from said sheet, forming the severed portions into bands encircling the ends of a calender roll, removing small ribbons from said bands, forcing fresh composition outwardly along the roll to renew the bands, and removing the continuous variegated sheet from the calender.

12. In combination with a sheeting calender adapted to form a continuous sheet of plastic composition, means for severing the central portion from the formed sheet thereby permitting bands of plastic composition to encircle opposite ends of a calender roll, means for removing the central portion of the formed sheet from the calender roll, and means for continuously removing ribbons from the outer extremities of the bands thus permitting fresh composition to flow outwardly along the calender roll to renew the bands.

13. In combination with a sheeting calender adapted to form a continuous sheet of plastic composition, means for removing the central portion of the formed sheet from the calender roll thus permitting the end sections of the formed sheet to encircle the calender roll, and means for continuously removing ribbons from the outer edges of the roll encircling sections of the sheet thus permitting fresh composition to renew the roll encircling sections.

VIRGIL SPENCER.